Oct. 14, 1947. W. P. PLACE 2,429,072
APPARATUS TO DETECT CHANGES OF VOLTAGES
Filed May 24, 1945
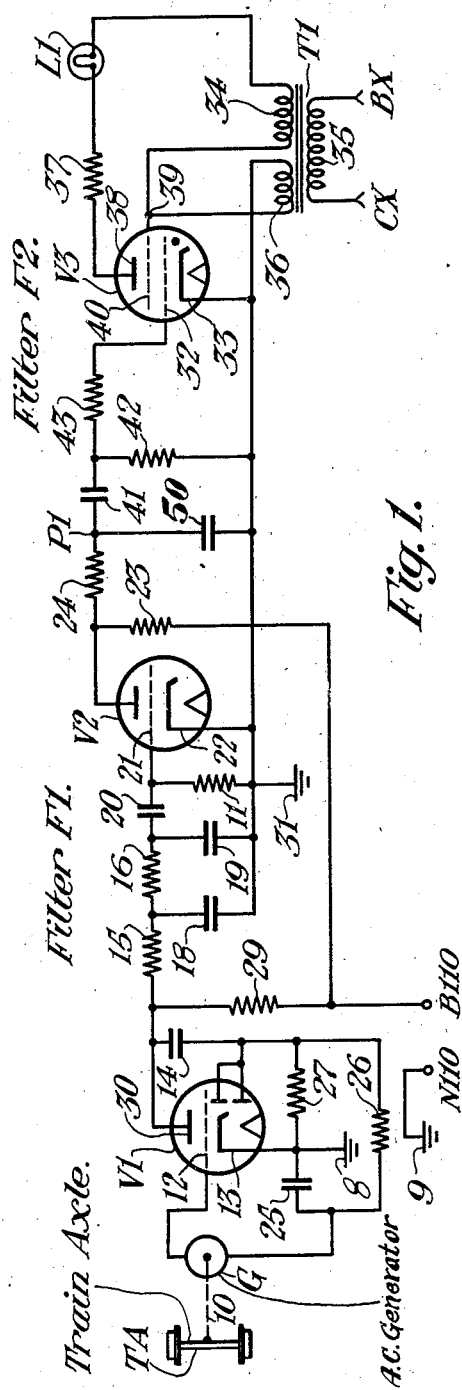
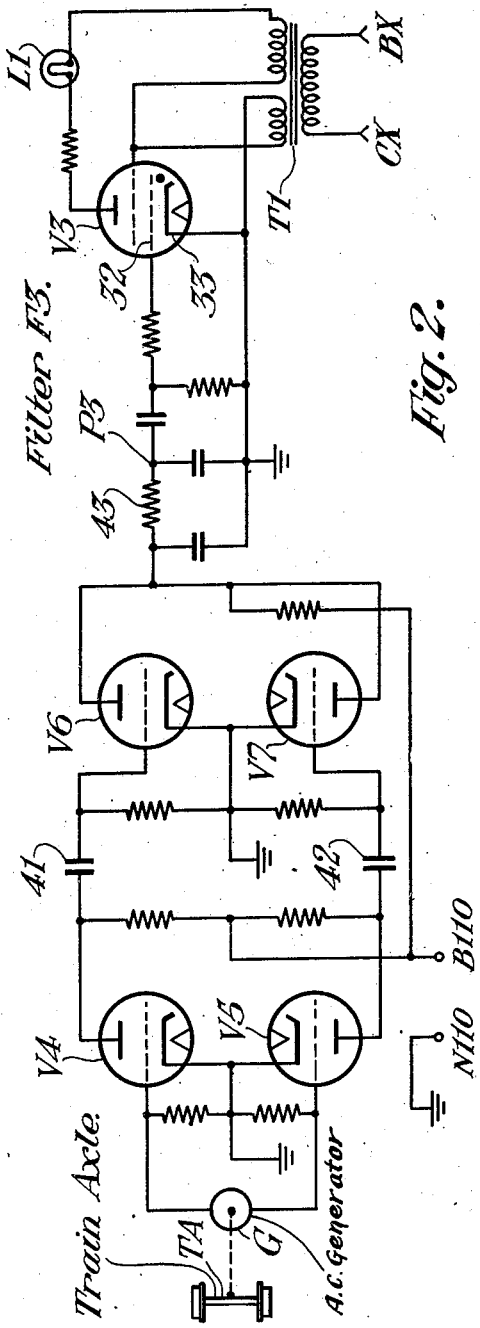
INVENTOR.
Willard P. Place.
BY
HIS ATTORNEY Patented Oct. 14, 1947

2,429,072

UNITED STATES PATENT OFFICE 2,429,072

APPARATUS TO DETECT CHANGES OF VOLTAGES

Willard P. Place, Penn Township, Allegheny County, Pa., assignor to The Union Switch & Signal Company, Swissvale, Pa., a corporation of Pennsylvania Application May 24, 1945, Serial No. 595,513

7 Claims. (Cl. 177—311)

1

My invention relates to apparatus to detect changes of voltages, and more particularly to apparatus to detect a rate of change of voltage caused by a variation of speed of a moving element.

Variations in an operating condition of an element may be detected by determining the changes of the voltage of a generator driven in synchronism with the operating condition of the element. Furthermore, the rate of change of the operating condition can be detected through the rate of change of the voltage of the generator. For example, the rate of change in the speed of a railway train, that is, acceleration or deceleration, can be detected through the rate of change of the voltage of a generator driven in accordance with the speed of the train.

Accordingly, a feature of my invention is the provision of novel and improved apparatus to detect a rate of change of voltage.

Another feature of my invention is the provision of novel means to detect the rate of change of the voltage of a generator driven at a speed proportional to the speed of a variable speed element.

Specifically, a feature of my invention is the provision of novel means to detect predetermined rates of change of the speed of a railway train.

Other features, objects and advantages of my invention will appear as the specification progresses.

The foregoing features, objects and advantages embodying my invention I attain by the provision of a novel circuit network between a source of voltage made variable in step with variations of an operating condition of an element and a controlled ionization type tube that governs an electroresponsive indicating device. The voltage source is preferably a generator, the voltage of which is directly proportional to the speed at which the generator is driven, the generator in turn being driven by a device having a variable operating condition. The circuit network includes amplifying and rectifying means and filters. The alternating voltage of the generator is applied to the circuit network for amplification and rectification to provide a corresponding unidirectional voltage. This unidirectional voltage is applied to a filter arranged to smooth out the ripples and to pass a voltage surge caused by a predetermined rate of change of the unidirectional voltage. A control electrode of a controlled ionization type of gas tube is connected to the filter in such a manner that a predetermined voltage surge through the filter causes the tube to be fired. An anode

2 circuit of the gas tubes is adapted to supply energy to an indicating device. Thus a predetermined rate of change in an operating condition of an element is detected by energization of an indicating device.

I shall describe two forms of apparatus embodying my invention, and shall then point out the novel features thereof in claims.

In the accompanying drawings, Figs. 1 and 2 are diagrammatic views showing two different forms of apparatus embodying my invention when used to detect a change of speed of a railway train. It is to be understood that my invention is not limited to use on railway trains and this one application serves to illustrate the many places the apparatus is useful.

In each of the two views like reference characters are used to designate similar parts.

Referring to Fig. 1 the reference character TA designates a wheel and axle unit of a railway train and to which unit a generator G is connected by any suitable drive mechanism indicated conventionally by a dotted line 10. The generator G is preferably an alternating current generator which supplies an alternating voltage proportional to the speed at which it is driven and thus it supplies an alternating voltage proportional to the speed of rotation of the wheel and axle unit of the train.

A vacuum tube V1 here shown as a diode-triode tube is controlled from the generator G, the generator being connected across control grid 12 and cathode 13 of the triode section of the tube. A direct current source having terminals designated B110 and N110 is connected to anode 30 and cathode 13 of the triode section of tube V1 through a resistor 29 and ground electrodes 8 and 9, and thus the alternating voltage of the generator is amplified in the anode current of the triode section of the tube. The alternating current component of the anode current of the triode section is applied to the diode section of the tube through a capacitor 14 and the rectified voltage is reflexed through the tube by means of resistors 26 and 27 and a capacitor 25 connected to the diode section and to the control grid of the tube in a manner which is readily understood by an inspection of the drawing.

The anode circuit of tube V1 is coupled to the input side of a triode tube V2 through a filter F1 and which filter network includes resistors 15, 16 and 11 and capacitors 18, 19 and 20 arranged in a well-known manner for such filters. The anode circuit of tube V2 is powered from the B110–N110 power source, a resistor 23 being included in the anode circuit and the circuit being completed through ground electrodes 31 and 9. Thus changes in the unidirectional voltage in the output of tube V1 are amplified at tube V2, the ripples of the unidirectional current being suppressed or smoothed out by the filter F1.

The anode circuit of tube V2 is connected to the input terminals of a second filter F2 through resistor 24 and the output side of this filter F2 is connected across a control electrode 32 and cathode 33 of a tube V3 which is of the controlled ionization type. Filter F2 includes capacitors 50 and 41 and resistors 42 and 43 arranged in a manner readily understood by an inspection of the drawings. Terminal P1 of the filter F2 will have a predetermined potential with respect to ground, and which potential will increase and decrease in step with the changes of voltage supplied from the generator G. When there is a sudden change in the potential of the terminal P1 with respect to ground a surge of direct voltage is passed through the filter and applied to the electrode 32 of tube V3.

Tube V3 is preferably powered from an alternating current source here shown as a secondary winding 34 of a transformer T1, a primary winding 35 of which transformer is connected to terminals BX and CX of a suitable source of alternating current, such as a generator, not shown. Another secondary winding 36 of transformer T1 serves to provide a bias voltage for a shield grid of tubes V3. Specifically, an anode-shield grid circuit can be traced from one terminal of secondary winding 34 through an indication lamp L1, resistor 37, anode 38 and tube space to cathode 33 of tube V3, secondary winding 36 of transformer T1, terminal 39 of shield grid 40 of tube V3 and to the other terminal of secondary winding 34. It is to be noted that secondary windings 34 and 36 are disposed in this anode-shield grid circuit for their instantaneous voltages to oppose each other. The secondary winding 34 provides a relatively high voltage and the secondary winding 36 provides a relatively low voltage and the parts are proportioned so that the positive half cycles of the voltage of secondary winding 34 are normally ineffective to fire tube V3 due to the negative bias voltage applied to shield grid 40 by the negative half cycles of the voltage of secondary winding 36. However, a predetermined positive voltage applied to control electrode 32 to oppose the negative bias of the shield grid permits the tube to be fired by the positive half cycles of the voltage of secondary winding 34 and with the tube V3 thus made conductive the lamp L1 is illuminated. The foregoing arrangement of the circuit of the controlled ionization tube V3 is disclosed and claimed in a copending application for Letters Patent of the United States, Serial No. 529,458, filed April 4, 1944, by Carl Volz, for Control circuits for vacuum tubes.

Normally, that is, when the train of which the wheel and axle unit TA is a part is moving at a substantially constant speed the generator G supplies a corresponding alternating voltage which is amplified and rectified and a charge is built up on capacitor 20, and which charge serves to govern the value of the anode current of tube V2. The value of the anode current of tube V2 in turn provides a corresponding potential of terminal P1. This potential of terminal P1 being of substantially a constant value, no voltage is applied to the control electrode 32 of tube V3 and the tube is non-conducting and the lamp L1 is dark.

Assuming the train is moving at a given speed and there is acceleration or deceleration, as the case may be, a corresponding change in the voltage supplied by the generator G is effected, the rate of change of the generated voltage corresponding to the rate of change of speed of the train. The parts are connected in such a manner and are so proportioned that a predetermined rate of change of speed of the train to cause a corresponding rate of change in the voltage of the generator results in a predetermined rate of change in the potential of the terminal P1 at the filter F2. This predetermined rate of change of potential of terminal P1 causes in turn a voltage surge to be passed through the filter F2 and applied to the control electrode 32 of tube V3 to drive the control electrode in the positive direction in potential with respect to the cathode and the tube is fired with the result the lamp L1 is illuminated to indicate this predetermined rate of change in the speed of the train. It is clear that in Fig. 1 there is disclosed apparatus through which a predetermined rate of change in the speed of the train, that is either a predetermined acceleration or deceleration, results in the illumination of the indication lamp L1.

Referring to Fig. 2, a generator G is connected to the wheel and axle unit TA to supply an alternating voltage proportional to the speed of the train the same as in Fig. 1. The terminals of generator G are connected to the grids of two triode tubes V4 and V5 acting as a push-pull amplifier. The anode circuits of tubes V4 and V5 are coupled through capacitors 41 and 42 to the grid circuits of two triode tubes V6 and V7 which act as a push-pull grid rectifier. For example, the tubes V6 and V7 are worked on the portion of their characteristic curves to rectify by giving a greater decrease than increase in the anode current in response to alternating voltage applied to the grids of the tubes. The anode circuits of tubes V6 and V7 are coupled to control electrode 32 and cathode 33 of the gas tube V3 through a resistor-capacitor filter F3. Thus, variations in the unidirectional voltage created in the anode circuits of tubes V6 and V7 are applied to filter F3 and a direct voltage surge is applied to the electrode 32 and cathode 33 of tube V3 when there is a predetermined rate of change in the unidirectional voltage. Normally, that is when the train is moving at a substantially constant speed, the alternating voltage of generator G is of a value corresponding to that speed and a correspondingly alternating voltage is created in the outputs of the tubes V4 and V5. This amplified alternating voltage is rectified to tubes V6 and V7 and terminal P3 of the filter F3 is of a substantially predetermined potential with respect to ground. Under this normal condition, tube V3 receives no controlling voltage and is non-conducting so that the indication lamp L1 is dark. In the event there is a change in the speed of the train, such as, for example, deceleration due to a brake application, the relatively rapid decrease in the alternating voltage of the generator G results in a corresponding rapid decrease in the potential of terminal P3 with respect to ground and this change in the potential of terminal P3 causes a direct voltage surge through the filter F3 to drive the control grid 32 of tube V3 in the positive diection with respect to the cathode and tube V3 is fired and becomes conductive to energize the lamp L1 as an indication of this predetermined deceleration of the train.

Thus there is disclosed in Fig. 2 apparatus through which a predetermined rate of change in the speed of the train is detected by the illumination of the indication lamp L1.

Although I have herein shown and described but two forms of apparatus to detect changes of voltages embodying my invention, it is understood that various changes and modifications may be made therein within the scope of the appended claims without departing from the spirit and scope of my invention.

Having thus described my invention, what I claim is:

1. In combination, a source of alternating voltage operatively associated with an operating element to supply a voltage which varies according to a given variable condition of the operating element, an amplifying-rectifying means to which said source is connected to provide a unidirectional voltage directly proportional to said alternating voltage, a controlled ionization tube, an electroresponsive indicating device receiving power from an anode circuit of said tube to energize the device when the tube is conductive, and a filter including resistance and capacitance having input terminals connected to said amplifying-rectifying means and output terminals connected across control electrodes of said tube to transmit a direct voltage surge to ionize the tube in response to a predetermined rate of change of said unidirectional voltage due to a predetermined rate of change of the alternating voltage of said source.

2. In combination, an alternating current generator connected to a variable speed element to supply an alternating voltage which varies in step with the speed of the element, an amplifier-rectifier means receiving such alternating voltage to supply a unidirectional voltage which varies in step with the alternating voltage, a filter including resistance and capacitance having connection to said amplifier-rectifier means to pass a direct voltage surge in response to changes of said unidirectional voltage, a controlled ionization tube having control electrodes connected to said filter to fire the tube in response to the direct voltage surge passed by said filter due to a predetermined rate of change in the unidirectional voltage, and indicator means receiving power from an anode circuit of said tube.

3. In combination, an alternating current generator connected to a variable speed element to supply an alternating voltage which varies in step with the speed of the element, a diode-triode electron tube having a control grid and cathode of its triode section connected to said generator to amplify said alternating voltage in an anode circuit of the triode section, the diode section of said tube receiving energy from said anode circuit to rectify said alternating voltage, reflex circuit means including resistance and capacitance to couple the diode section to said control grid, a controlled ionization tube, an indicating device receiving power from an anode circuit of said ionization tube, and means including a filter to couple a control electrode and cathode of said ionization tube to the anode circuit of the diode-triode tube to apply a direct voltage surge to said control electrode to fire the ionization tube and energize said indicating device in response to a predetermined rate of change in the voltage of said generator.

4. In combination, an alternating generator connected to a variable speed element to supply an alternating voltage which increases and decreases with an increase and a decrease respectively of the speed of said element, a diode-triode tube having a control grid and cathode of its triode section connected to said generator to amplify the alternating voltage in an anode circuit of the triode section, said anode circuit coupled to the diode section of the tube to rectify such alternating voltage, reflex circuit means including resistance to couple said diode section to said control grid, a first and a second filter each including capacitance and resistance, another amplifier tube, means including said first filter to couple said triode section to a control grid and cathode of said other tube, a gas tube, means including said second filter to couple an anode circuit of said other tube to a control electrode and cathode of said gas tube to fire said gas tube in response to a predetermined rate of change in the alternating voltage of said generator, and an indicator receiving power from an anode circuit of said gas tube.

5. In combination, an alternating current generator connected to a variable speed element to supply an alternating voltage that varies with the speed of the element, a diode-triode electron tube having its triode section provided with an anode circuit including a power source and a control grid and cathode connected to said generator to amplify said alternating voltage, said anode circuit coupled to the diode section of said tube to rectify the alternating voltage, another amplifying electron tube, a first filter including capacitance and resistance receiving the rectified voltage from said diode-triode tube and passing such rectified voltage to said amplifier tube, a gas tube, a second filter including resistance and capacitance to connect the output of said amplifier tube to a control electrode and cathode of said gas tube, said second filter connected in such a manner as to pass a direct voltage surge to said control electrode in response to a variation of said rectified voltage and the parts so proportioned that said direct voltage surge serves to fire the gas tube in response to the rate of change of the rectified voltage due to a predetermined rate of change of said alternating voltage, and an indicator energized by the current passed by said gas tube.

6. In combination, an alternating current generator connected to a variable speed element to supply an alternating voltage that varies with the speed of the element, a first pair of electron tubes connected to said generator in a push-pull arrangement to amplify said alternating voltage, a second pair of electron tubes connected to the output of said first pair of tubes in a push-pull arrangement to rectify said alternating voltage, a gas tube, a filter including resistors and capacitors to connect the output of said second pair of tubes to a control electrode and cathode of said gas tube to pass a direct voltage surge to fire the gas tube in response to the direct voltage surge passed through said filter due to a predetermined rate of change of said generator voltage as caused by a predetermined rate of change in the speed of said element, and an indicator energized by the current passed by said gas tube to indicate such change of speed of the element.

7. In combination, an alternating current generator connected to a variable speed element to supply an alternating voltage that varies with the speed of the element, a first pair of electron tubes connected in a push-pull arrangement and disposed to function as amplifiers, said generator connected to control grids of said first pair of tubes to amplify said alternating voltage, a second pair of electron tubes connected in a push-pull arrangement and disposed for grid rectification, said first pair of tubes having their output side coupled to control grids of said second pair of tubes to rectify said alternating voltage, a gas tube, a filter including resistors and capacitors, a control electrode and cathode of said gas tube connected to the output side of said second pair of tubes through said filter to fire said gas tube by a direct voltage surge passed by said filter due to the rate of change of the rectified voltage as caused by the rate of change of the alternating voltage due to a predetermined rate of change of the speed of said element, and an indicator interposed in an anode circuit of said gas tube energized by the current passed by the gas tube to indicate such rate of change in the speed of the element.

WILLARD P. PLACE.

REFERENCES CITED

The following references are of record in the file of this patent:

UNITED STATES PATENTS

| Number | Name | Date |
|---|---|---|
| 1,096,942 | Owens | May 19, 1914 |